US011761122B2

(12) United States Patent
Roess et al.

(10) Patent No.: US 11,761,122 B2
(45) Date of Patent: Sep. 19, 2023

(54) APPARATUS FOR LOOSENING FIBER MATERIAL PACKED IN BALES

(71) Applicant: Roess Nature Group GmbH & Co. KG, Twistringen (DE)

(72) Inventors: Thomas Roess, Twistringen (DE); Henner Lischkowitz, Colnrade-Holtorf (DE)

(73) Assignee: Roess Nature Group GmbH & Co. KG, Twistringen (DE)

( * ) Notice: Subject to any disclaimer, the term of this patent is extended or adjusted under 35 U.S.C. 154(b) by 456 days.

(21) Appl. No.: 16/924,838

(22) Filed: Jul. 9, 2020

(65) Prior Publication Data

US 2021/0010167 A1    Jan. 14, 2021

(30) Foreign Application Priority Data

Jul. 10, 2019   (DE) .......................... 202019103807.1

(51) Int. Cl.
| | |
|---|---|
| *D01G 7/04* | (2006.01) |
| *A01F 29/00* | (2006.01) |
| *A01F 29/06* | (2006.01) |
| *A01F 29/10* | (2006.01) |
| *A01F 29/12* | (2006.01) |
| *D01G 7/08* | (2006.01) |
| *D01G 7/10* | (2006.01) |
| *A01D 87/12* | (2006.01) |

(52) U.S. Cl.
CPC ............ *D01G 7/04* (2013.01); *A01F 29/005* (2013.01); *A01F 29/06* (2013.01); *A01F 29/10* (2013.01); *A01F 29/12* (2013.01); *D01G 7/08* (2013.01); *D01G 7/10* (2013.01); *A01D 2087/128* (2013.01); *Y10S 241/605* (2013.01)

(58) Field of Classification Search
CPC .... Y10S 241/605; A01F 29/005; A01F 29/06; A01F 29/10; A01F 29/12; A01D 87/127; A01D 2087/128
USPC .......................................................... 241/605
See application file for complete search history.

(56) References Cited

U.S. PATENT DOCUMENTS

| | | | | |
|---|---|---|---|---|
| 4,083,501 | A | * | 4/1978 | Ryan ..................... A01F 29/005 241/154 |
| 5,099,755 | A | * | 3/1992 | Montano ............... A01F 29/005 83/425.3 |
| 5,505,391 | A | * | 4/1996 | Krueger ................ A01F 29/005 241/223 |
| 5,556,041 | A | * | 9/1996 | Cheesman ........... A01F 29/005 241/200 |

(Continued)

FOREIGN PATENT DOCUMENTS

| | | | | | |
|---|---|---|---|---|---|
| CN | 106435842 | A | * | 2/2017 | ............... D01G 7/04 |
| WO | WO-9317548 | A1 | * | 9/1993 | ........... A01F 29/005 |

*Primary Examiner* — Katrina M Stransky
*Assistant Examiner* — Jared O Brown
(74) *Attorney, Agent, or Firm* — SEED INTELLECTUAL PROPERTY LAW GROUP LLP

(57) ABSTRACT

The present invention concerns an apparatus for loosening fiber material packed in bales, comprising a conveyor region for conveying the fiber material along a conveyor direction. The conveyor region includes a feed portion, a buffer portion and a discharge portion. A first roller arrangement is arranged in the transitional region between the feed portion and the buffer portion and a second roller arrangement is arranged in the transitional region between the buffer portion and the discharge portion.

14 Claims, 2 Drawing Sheets

(56) References Cited

U.S. PATENT DOCUMENTS

| | | | | |
|---|---|---|---|---|
| 6,546,986 B1* | 4/2003 | Waggoner | ................ | B27N 1/00 |
| | | | | 241/605 |
| 9,163,191 B2* | 10/2015 | Zeeck | ..................... | F23G 5/444 |
| 2006/0054460 A1* | 3/2006 | Rubenach | ................ | D01G 7/08 |
| | | | | 198/464.4 |
| 2018/0162563 A1* | 6/2018 | Lischkowitz | ........... | B65B 35/24 |

* cited by examiner

APPARATUS FOR LOOSENING FIBER MATERIAL PACKED IN BALES

BACKGROUND

Technical Field

The invention concerns an apparatus for loosening or breaking up fiber material which is packed or pressed in bales. An example of fiber material packed in bales includes straw bales.

Description of the Related Art

Fiber material like straw is frequently pressed into bales after threshing for transport purposes and is thus prepared for various purposes of use. Thus for example straw serves for use in the agricultural sector by being employed as bedding or litter material or as fodder. Frequently however fiber material, like for example straw, is also used for the production of so-called fascines for consolidating gravity slopes or also in hydraulic engineering for bank stabilization or for consolidating the beds of bodies of water. The fiber material is further also used for the production of non-woven fiber mats. What is common to all areas of use in this respect is that the previously pressed bales of the fiber material that serve for easier transport of the fiber material make it necessary to unpack and loosen the fiber material from its bale form prior to further processing.

In order for example to put the fiber material into a fresh form it firstly has to be loosened up as completely as possible. In other words the connections between as far as possible all fibers have to be undone. It is only then that in a fresh shaping process the fiber material can be put into a uniform, for example plate-like or tubular form, for the production of a non-woven fiber mat or a fascine.

So-called bale openers are known from the state of the art for that purpose, having at least two mutually superposed rollers, against which a bale of fiber material is pressed and which then separate the fiber material out of the interconnected assemblage thereof in the bale. The problem with the known bale openers is that it frequently happens that individual fiber clusters which are pressed together and not mechanically detached from each other are conveyed for example by way of the rollers without being loosened up. Complete loosening therefore does not occur, and that can result in blockage of subsequent components of the machine for further processing of the fibers. Those non-loosened accumulations are frequently also referred to as so-called clumps or lumps.

In order further to combat non-loosened accumulations of the fiber material bale openers have already been developed, comprising more than two rollers, more specifically for example three rollers arranged in mutually superposed relationship. Such bale openers, with rollers in their mutually superposed relationship, are of a substantially greater height than a bale so that this leads to a reduction in the accumulations of fibers when they are conveyed through the rollers upwardly and in so doing fall apart. Nonetheless the above-mentioned accumulations can still not be completely avoided in that way.

BRIEF SUMMARY

Provided is an apparatus which provides for improved separation or loosening of the fibers of fiber material which is pressed or packed in bales.

For that purpose the present disclosure concerns an apparatus for loosening up fiber material packed in bales. Fiber material here includes any fiber material, for example straw, coconut, compost and xylite fibers or fiber mixtures as well as rice straw fibers. Bale here denotes an item identifying a unit which identifies the packed, pressed, or bound fiber material in bundle form in order to be able to transport and store it predominantly more easily. The term bale is here not limited to a single form and therefore also includes round bales or bales of angular shape.

The apparatus includes a conveyor region for conveying the fiber material along a conveyor direction. In that respect the conveyor region includes a feed portion, a buffer portion and a discharge portion. In addition arranged in the transitional region between the feed portion and the buffer portion is a first roller arrangement and arranged in the transitional region between the buffer portion and the discharge portion is a second roller arrangement.

Preferably the buffer portion is of a width which extends in the conveyor direction and corresponds at least to the spacing between the lower rollers of the first and second roller arrangements. The width is advantageously at least 80 centimeters, at least 1 meter or at least 1.2 meters.

By virtue of the buffer portion with the roller arrangements arranged upstream and downstream thereof in the conveyor direction the fiber material is firstly released from the bale assemblage with the first roller arrangement, it can then be deposited in the buffer portion in pre-loosened form and is then further loosened up by the second roller arrangement in a loose or at least less densely packed form. Larger amounts of the fiber material, that were not yet completely loosened out of their assemblage in the bale after passing through the first roller arrangement, can in that way be further loosened or unpacked by virtue of the second roller arrangement. Interruption-free operation without clogging of subsequent further processing machines or machine components, for example a blower or a further shaping device for the fiber material, is possible in that way. In particular in that way an entire processing chain can be operated continuously without any interruption. It is accepted that the apparatus is more complicated and elaborate in comparison with known apparatuses and in particular takes up a greater amount of structural space as the advantage of interruption-free operation of subsequent components compensates for that aspect.

According to a first embodiment the conveyor region includes a conveyor surface, on which the bale and the fiber material later resulting therefrom can be transported. For that purpose the conveyor surface has at least one, two and particularly preferably three conveyor belts. In the case of three conveyor belts each conveyor belt is associated with one of the above-defined portions of the conveyor region so that the feed portion has a first conveyor belt, the buffer portion has a second conveyor belt and the discharge portion has a third conveyor belt.

The fiber material in the bale assemblage and also in the loosened form can thus be conveyed at an individual speed in the conveyor direction.

According to a further embodiment the first conveyor belt associated with the feed portion overlaps with an end region, as viewed in the conveyor direction, over an initial region, viewed in the conveyor direction, of the second conveyor belt associated with the buffer portion. The second conveyor belt associated with the buffer portion also overlaps with an end region as viewed in the conveyor direction over an initial region, viewed in the conveyor direction, of the third conveyor belt associated with the discharge portion. The first conveyor belt is therefore arranged with its end region above the initial region of the second conveyor belt, wherein the second conveyor belt is in turn arranged with its end region above the initial region of the third conveyor belt. That therefore counteracts the fiber material from falling down and thus counteracts contamination of the surroundings or the apparatus.

In a further embodiment the first conveyor belt associated with the feed portion is preferably oriented in ordinary use substantially parallel with its conveyor surface to a support ground surface on which the apparatus can be arranged for regular use.

The conveyor belt associated with the buffer portion, namely the second conveyor belt, and the conveyor belt associated with the discharge portion, namely the third conveyor belt, are inclined in the conveyor direction so that the spacing of the second conveyor belt increases in the conveyor direction from a ground surface on which the apparatus can be arranged in regular use. Alternatively or in addition the spacing of the third conveyor belt, that is to say the conveyor belt associated with the discharge portion, also increases in the conveyor direction relative to said ground surface. In particular the angle of inclination of the third conveyor belt, that is to say the conveyor belt associated with the discharge portion, is greater than the angle of inclination of the second conveyor belt, that is to say the conveyor belt associated with the buffer portion.

The inclination of the third conveyor belt provides that advantageously the loosened fiber material can be conveyed to a suitable height in order then for it to be conveyed for example from above into a further apparatus for further processing thereof. In addition, in particular also due to the inclination of the second conveyor belt, it is possible in that way to achieve the above-mentioned overlap of the conveyor belts. Alternatively more specifically a stepped arrangement of the conveyor belts would be necessary to form the overlapping, in which case then the apparatus would already have to be arranged in the feed portion at a great height in relation to a ground surface to provide the step configuration. In that case it would in turn be necessary to lift the bales to that great height, and that would result in a high level of complication and involvement when loading the apparatus with the bales.

According to a further embodiment the feed portion has a pushing device or a holding device for pushing or holding the bales with a force acting in the conveyor direction. In that way it is possible to counteract an opposing force which is exerted on the bales by the first roller arrangement in order to prevent the bale being accelerated out of the apparatus by the first roller arrangement in opposite relationship to the conveyor direction of the first conveyor belt which is associated with the feed portion.

In a further embodiment the apparatus has a conveyor blower or a blower for further conveying movement of the fiber material which is conveyed out of the discharge portion. A conveyor blower serves preferably for simply moving the fiber material along for further processing, for example in a shaping apparatus.

In a further embodiment, disposed in the end region, as viewed in the conveyor direction, of the conveyor region, therefore preferably in the end region of the third conveyor belt, is a third roller arrangement and/or a hopper into which the end region of the third conveyor belt opens. In that arrangement the third roller arrangement serves for metering of the fiber material into the hopper and the hopper serves for feeding the fiber material into the blower. In the situation where accumulations of the loosened fiber material occur in the discharge portion then that accumulation is broken up by virtue of the third roller arrangement and the hopper serves for specifically targeted feed of the fiber material to the blower without fiber material dropping down past the blower.

In a further embodiment the third roller arrangement includes a plurality of cylindrical rollers which each include a cylinder casing with a peripheral surface. Arranged on the peripheral surface are peripherally adjacent projections which each extend along an axis of rotation of the roller. The fiber material can be meteredly fed in a suitable fashion by virtue of those projections.

In a further embodiment the first roller arrangement and/or the second roller arrangement each includes at least two or precisely two rollers. Each of the rollers is rotatably about an axis of rotation extending parallel to a transverse direction of the conveyor direction. Such an arrangement of two rollers respectively of the first roller arrangement and the second roller arrangement has been shown to be particularly suitable for unpacking and loosening up the fiber material from the bale. In particular in that way only one single additional roller is necessary in comparison with known apparatuses which have three mutually superposed rollers in order to achieve improved loosening or breaking-up of the fiber material in spite of the comparatively slight additional complication and expenditure.

In a further embodiment at least one or all of the rollers of the first roller arrangement and/or the second roller arrangement are in cylinder form. The cylinder form includes a peripheral surface, with a respective plurality of projections being arranged thereon. The projections are preferably triangular or zigzag-shaped. Particular preferably at a first end in the region of the peripheral surface the projections are each of a narrower extent in the direction of rotation than in the longitudinal direction of the cylinder. Particularly preferably the projections taper to a point from a second end opposite to the first end. Furthermore the projections are particularly preferably arranged on the peripheral surface in a plurality of rows arranged in mutually juxtaposed relationship in the direction of rotation and which in turn extend in the longitudinal direction of the cylinder parallel to the axis of rotation.

Such a configuration of the projections particularly suitably serves for unpacking and/or loosening up the bales of fiber material.

In a further embodiment the first roller arrangement and/or the second roller arrangement includes two rollers, the axes of rotation of which extend through a perpendicular to the conveyor direction or a line extending at an acute angle relative to the perpendicular, and thus in regular use are arranged in mutually superposed relationship. In that respect preferably a first roller of the first roller arrangement, which is closer to the conveyor surface than a second roller of the first roller arrangement is arranged displaced in the conveyor direction downstream of the second roller. In the conveyor direction therefore the first roller is arranged further downstream in the conveyor direction than the second roller of the first roller arrangement. That arrangement reduces the risk of relatively large amounts of fiber material being slung into the buffer portion by way of the upper roller.

Preferably moreover a first roller of the second roller arrangement which is arranged further away from the conveyor region than a second roller of the second roller arrangement is arranged displaced in the conveyor direction downstream of the second roller. In other words the first roller of the second roller arrangement is arranged further downstream in the conveyor direction than the second roller of the second roller arrangement. The arrangement of the rollers of the second roller arrangement also promotes comparatively more uniform guidance and further loosening of the fiber material into the discharge portion.

In a further embodiment all rollers of the first and second roller arrangements involve the same direction of rotation. The rollers are preferably rotating clockwise from a view on to the apparatus from the side from which the conveyor direction extends from left to right. The same direction of rotation of the rollers avoids the risk of relatively large amounts of straw becoming jammed between the rollers and then being further conveyed from one portion into the next portion without being further loosened up.

In a further embodiment the apparatus includes a housing having at least a top side and two side portions, wherein the housing houses at least the first roller arrangement, the second roller arrangement and the buffer portion laterally with the side portions and upwardly with the top side. In addition disposed in the buffer portion is a separating wall which extends from the top side of the housing between the side walls in a direction towards the second conveyor belt. That separating wall, in the situation where nonetheless relatively large accumulations of non-loosened fiber material are slung into the buffer portion by way of the upper roller of the first roller arrangement, serves to provide that those non-loosened accumulations are pre-loosened by impacting against the separating wall so that they can then be completely loosened up in the second roller arrangement. In addition that separating wall also serves to catch the above-mentioned accumulations which are slung by way of the upper roller of the first roller arrangement in the buffer portion so that they are not further hurled directly to the upper roller of the second roller arrangement and further conveyed directly into the discharge portion without being further broken up.

In a further embodiment the conveyor speed of the conveyor belt or belts is adjustable, open-loop controllable or closed-loop controllable. In particular the apparatus includes at least one light barrier to determine the height of the fiber material in the buffer portion and automatically to open-loop control or closed-loop control at least the conveyor speed of the conveyor belt associated with the feed region, in dependence on the fiber material height in the buffer portion.

That makes it possible to prevent excessively large amounts of the fiber material becoming accumulated in the buffer portion and thus in spite of the second roller arrangement relatively large amounts of straw in the bale assemblage being further conveyed in a direction towards a blower.

In addition one or more embodiments of the invention concerns a method of loosening up fiber material packed in bales with an apparatus in accordance with one of the above-mentioned embodiments.

BRIEF DESCRIPTION OF THE SEVERAL VIEWS OF THE DRAWINGS

Further configurations will be apparent from the embodiments by way of example described in greater detail with reference to the Figures in which.

DETAILED DESCRIPTION

Figure 1:
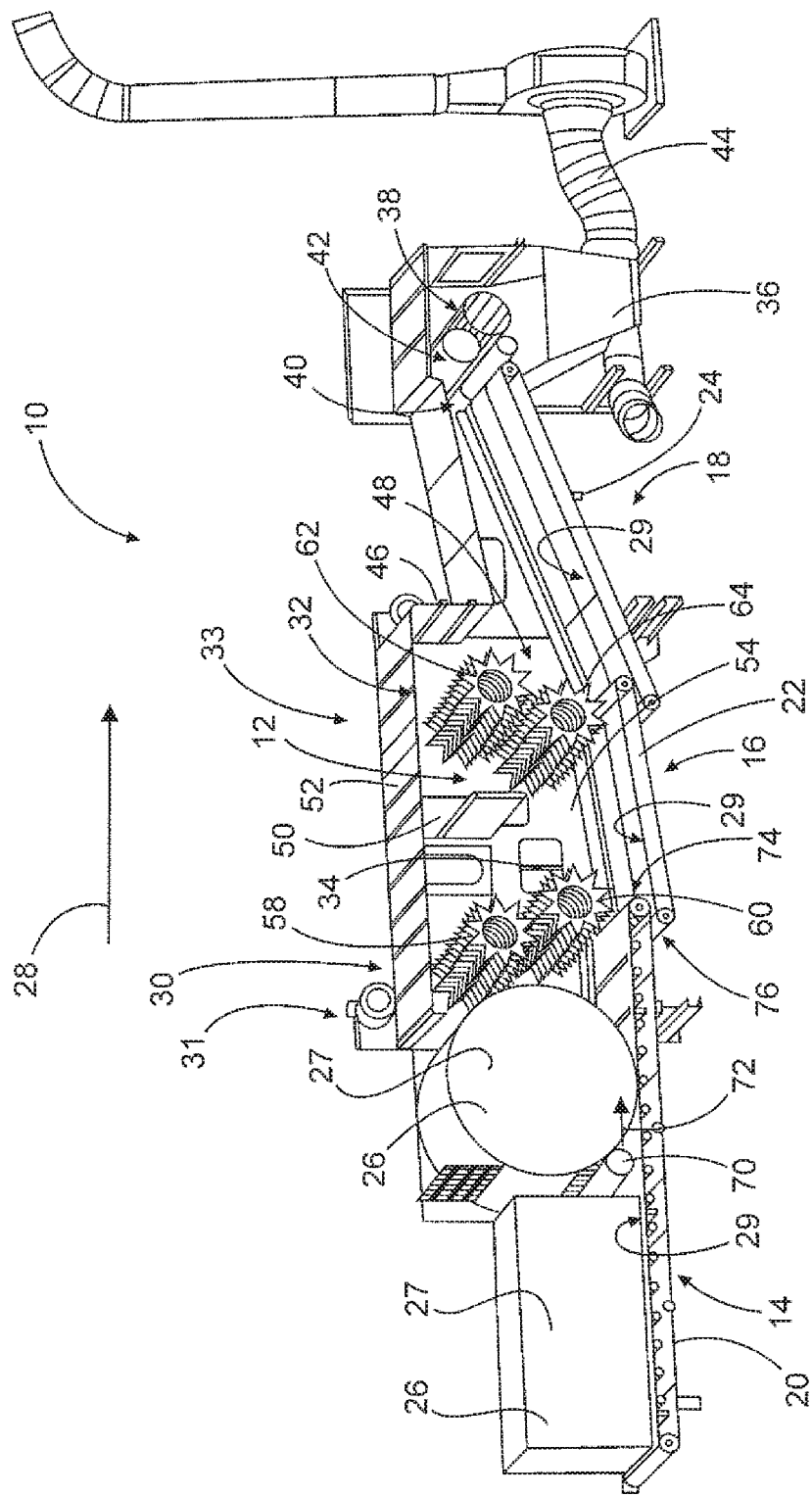
FIG. 1 shows a diagrammatic side view of an embodiment of the apparatus with opened side wall of the housing.

FIG. 1 shows an apparatus 10 for unpacking, loosening and/or breaking up fiber material packed in bales. For that purpose the apparatus includes a conveyor region 12 having a feed portion 14, a buffer portion 16 and a discharge portion 18. Conveyor belts 20, 22 and 24 are respectively arranged in the feed portion 14, the buffer portion 16 and the discharge portion 18 to convey fiber material 27 which is initially packed in the form of bales 26 along a conveyor direction 28 from the feed portion 14 in the direction towards the discharge portion 18. For that purpose the conveyor belts 20, 22, 24 each include a conveyor surface 29 on their top side. In that arrangement the bales 26 are fed by way of the feed portion 14 to a first roller arrangement 30 arranged in a first transitional region 31 between the feed portion 14 and the buffer portion 16. With the first roller arrangement 30, the fiber material 27 contained in the bale 26 is released from the pressed state or the interlinked assemblage of the fiber in the bale. The loosened fiber material 27 then drops on to the conveyor belt 22 associated with the buffer portion 16 and is further conveyed in the conveyor direction 28 to a second roller arrangement 32 arranged in a second transitional region 33 between the buffer portion 16 and the discharge portion 18. In that respect a light barrier 34 monitors the amount of the loosened fiber material 27 in the buffer portion 16 in order thus to move the conveyor belt 20 associated with the feed portion 14 more quickly or more slowly or even to stop it if too much fiber material 27 is piled up in the buffer portion 16.

After the buffer portion 16 the fiber material 27 passes through the second roller arrangement 32 for further loosening thereof and in particular to detach from each other fibers which have not yet been completely released from an interlinked assemblage in the bale and which are present in the form of accumulations in the buffer portion 16. The fiber material 27 is then passed to a hopper 36 by way of the third conveyor belt 24 associated with the discharge portion 18, wherein, in the entry region 38 of the hopper 36, that is to say in the end region 40 of the conveyor belt 24 associated with the discharge portion 18, the fiber material 27 is uniformly introduced into the hopper 36 by way of a third roller arrangement 42 which includes metering rollers. The fiber material 27 drops through the hopper 36 into a conveyor blower 44 which conveys the fiber material 27 for further processing. By virtue of a side wall not being shown in FIG. 1 of a housing 46 of the apparatus 10 the roller arrangements 30, 32, 42 and further components in the interior 48 of the apparatus 10 can be viewed there. In addition it is visible in that respect that arranged in the buffer portion 16 is a separating wall 50 which extends from a top side 52 of the housing 46 in the direction of the conveyor surface 29 of the conveyor belt 22 associated with the buffer portion 16, between the side walls 54. That separating wall 50 serves to loosen fiber material 27 of the bale 26, which has not been loosened up from within the bale, that passes into the buffer portion 16 by way of the upper roller 58, by hitting against the separating wall 50 and/or to prevent it being thrown by the first roller arrangement 30 on to the second roller arrangement 32. All rollers 58, 60, 62, 64 of the first roller arrangement 30 and the second roller arrangement 32 rotate clockwise from that view.

It can further be seen that the rollers 58, 60 of the first roller arrangement 30 are displaced relative to each other. A first roller 60 of the first roller arrangement 30 which corresponds to a lower roller of the first roller arrangement 30 and is closer to the conveyor surface 29 is arranged displaced in the conveyor direction 28 downstream of a second roller 58 corresponding to an upper roller of the first roller arrangement 30. The rollers 62, 64 of the second roller arrangement 32 are also arranged displaced in order still further and better to loosen up the fiber material 27 which is further conveyed out of the buffer portion 16.

There is also a holding device 70 in the feed portion 14, which produces a force in the conveyor direction 28 in order to prevent or at least counteract a rolling-back movement, produced by the first roller arrangement 30, on the part of the bale 36 which is being loosened up at the current time. A force 72 is thus exerted on the bale 26 in the conveyor direction 28 by the holding device 70.

It can also be seen that in an end region 74 the first conveyor belt 20 overlaps an initial region 76 of the second conveyor belt 22 and an end region 78 of the second conveyor belt 22 overlaps an initial region 80 of the third conveyor belt 24.

Figure 2:
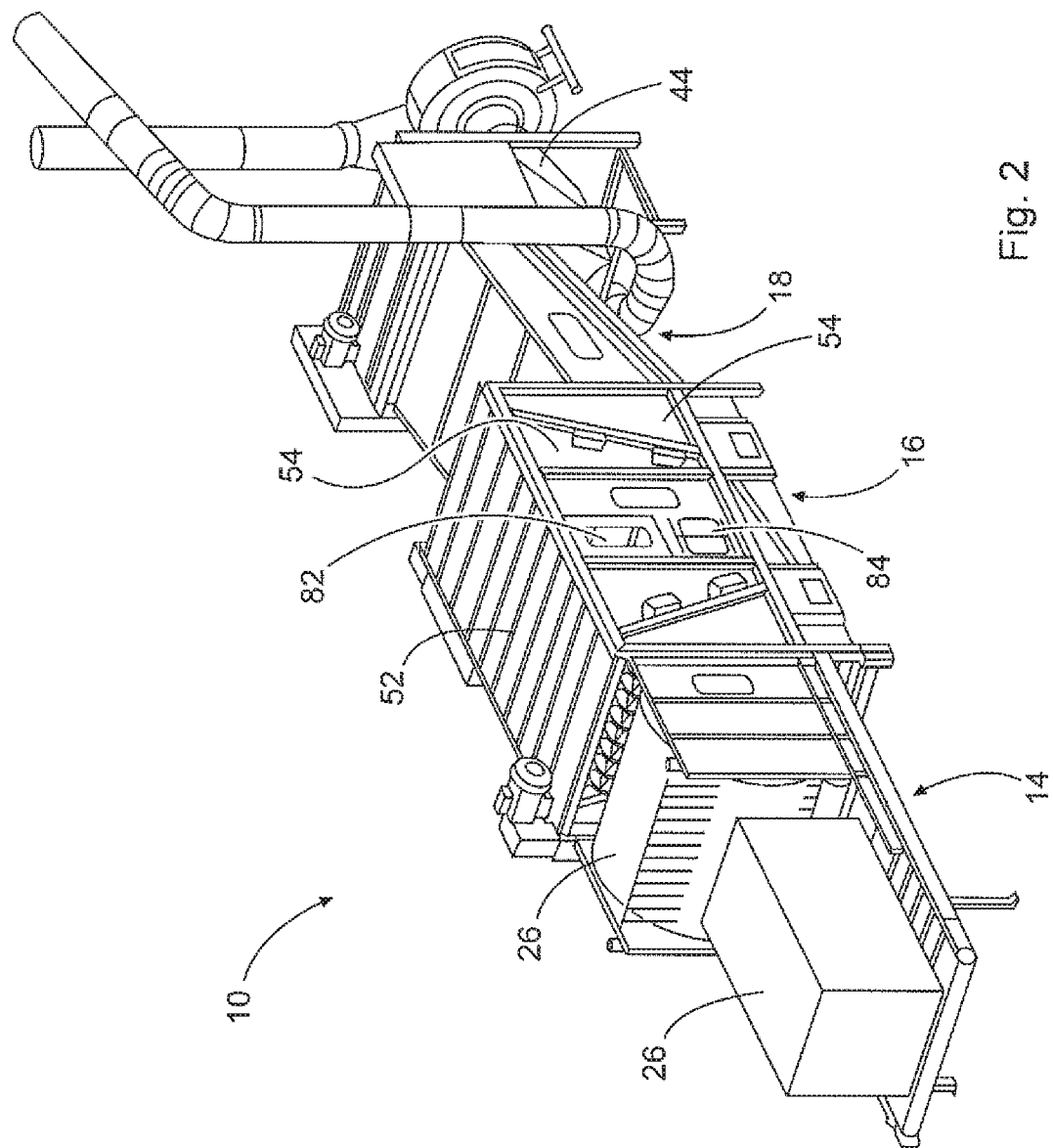
FIG. 2 shows a further perspective view of an embodiment of the apparatus.

FIG. 2 shows a further view of the apparatus 10, with the housing 46 now being shown closed. It is thus also possible to see the front one of the side walls 54. Overall the housing 46 is closed except for a viewing window 82 and openings 84 for the light barriers 34, in the buffer portion and in the discharge portion 18, to prevent the fiber material 27 from flying around. The same references in FIG. 2 correspond to the same features as in FIG. 1.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for loosening fiber material packed in bales, comprising:
 a conveyor region for conveying the fiber material in a conveyor direction, wherein the conveyor region includes a feed portion, a buffer portion, and a discharge portion, wherein a first roller arrangement is arranged in a first transitional region between the feed portion and the buffer portion, and wherein a second roller arrangement is arranged in a second transitional region between the buffer portion and the discharge portion, wherein at least one of the first roller arrangement and the second roller arrangement comprise a peripheral surface and a plurality of projections arranged on the peripheral surface,
 wherein the first roller arrangement and the second roller arrangement have at least two rollers, respectively, wherein each of the rollers is rotatable about an axis of rotation which extends parallel to a transverse direction of the conveyor direction,
 wherein the two rollers of each of the first roller arrangement and the second roller arrangement are arranged so that their axes of rotation extend perpendicular to the conveyor direction or a line which extends at an acute angle relative to the perpendicular and are so arranged in mutually superposed relationship, and
 wherein a first roller of the first roller arrangement that is closer to a conveyor surface than a second roller of the first roller arrangement is arranged in the conveyor direction downstream of the second roller, and wherein a first roller of the second roller arrangement which is arranged further away from the conveyor surface than a second roller of the second roller arrangement is arranged in the conveyor direction downstream of the second roller.

2. The apparatus according to claim 1 wherein the conveyor region has a conveyor surface formed by one or more conveyor belts.

3. The apparatus according to claim 2 wherein the conveyor surface is formed by first, second, and third conveyor belts, wherein the first conveyor belt is associated with the feed portion, the second conveyor belt is associated with the buffer portion, and the third conveyor belt is associated with the discharge portion.

4. The apparatus according to claim 3 wherein the first conveyor belt overlaps with an end region over an initial region of the second conveyor belt, and the second conveyor belt overlaps with an end region over an initial region of the third conveyor belt.

5. The apparatus according to claim 3 wherein at least the first second conveyor belt and the third conveyor belt are inclined, wherein the conveyor surfaces of the first, second, and third conveyor belts rise in the conveyor direction.

6. The apparatus according to claim 2 comprising a conveyor blower configured to blow the fiber material conveyed out of the discharge portion.

7. The apparatus according to claim 6 comprising a third roller arrangement and a hopper is arranged in the end region of a third conveyor belt associated with the discharge portion.

8. The apparatus according to claim 7 wherein the third roller arrangement has a plurality of rollers, each of a cylindrical shape with a peripheral surface, the peripheral surface having a plurality of peripherally adjacent projections.

9. The apparatus according to claim 1 wherein the rollers are of a cylindrical shape,
 wherein the plurality of projections are each triangular or zigzag-shaped projections,
 wherein the plurality of projections are of a narrower extent at a first end in a region of the peripheral surface in a longitudinal direction than in a direction of rotation of the rollers,
 wherein the plurality of projections taper to a point towards a second end opposite to the first end, and
 wherein the plurality of projections are arranged on the peripheral surface in a plurality of rows which are arranged in mutually juxtaposed relationship in the direction of rotation and which extend in the longitudinal direction of the rollers parallel to the axis of rotation.

10. The apparatus according to claim 1 wherein the rollers of the first roller arrangement and the second roller arrangement have a same direction of rotation and are configured to rotate in a clockwise direction when viewed from a side of the apparatus.

11. The apparatus according to claim 1 comprising a housing having at least a top side and two side walls, wherein the first roller arrangement, the second roller arrangement, and the buffer portion are in the housing, wherein a buffer wall is a separating wall arranged from the top side of the housing between the side walls and extends in a direction towards a conveyor belt associated with the buffer portion.

12. The apparatus according to claim 1 wherein the conveyor region has a conveyor surface formed by one or more conveyor belts, wherein conveyor speed of the one or more conveyor belts is adjustable, open-loop controllable, or closed-loop controllable.

13. The apparatus according to claim 1 comprising a device arranged in the feed portion, wherein the device is configured to push or hold the bales with a force in the conveyor direction.

14. An apparatus for loosening fiber material packed in bales, comprising:

a conveyor region for conveying the fiber material in a conveyor direction, wherein the conveyor region includes a feed portion, a buffer portion, and a discharge portion, wherein a first roller arrangement is arranged in a first transitional region between the feed portion and the buffer portion, and wherein a second roller arrangement is arranged in a second transitional region between the buffer portion and the discharge portion, wherein at least one of the first roller arrangement and the second roller arrangement comprise a peripheral surface and a plurality of projections arranged on the peripheral surface, wherein the conveyor region has a conveyor surface formed by one or more conveyor belts, wherein conveyor speed of the one or more conveyor belts is adjustable, open-loop controllable, or closed-loop controllable, and a light barrier configured to determine a height of the fiber material in the buffer portion and to automatically provide for open-loop control or closed-loop control of the conveyor speed of a first conveyor belt of the one or more conveyor belts that is associated with the feed portion in dependence on the height of the fiber material in the buffer portion.

* * * * *

UNITED STATES PATENT AND TRADEMARK OFFICE
CERTIFICATE OF CORRECTION

| | | |
|---|---|---|
| PATENT NO. | : 11,761,122 B2 | Page 1 of 1 |
| APPLICATION NO. | : 16/924838 | |
| DATED | : September 19, 2023 | |
| INVENTOR(S) | : Thomas Roess et al. | |

It is certified that error appears in the above-identified patent and that said Letters Patent is hereby corrected as shown below:

In the Claims

<u>Column 8, Claim 5, Lines 34-35:</u>
"at least the first second conveyor" should read: --at least the second conveyor--.

Signed and Sealed this
First Day of April, 2025

Coke Morgan Stewart
*Acting Director of the United States Patent and Trademark Office*